Sept. 6, 1938.  C. C. SHAFER  2,128,969
HAND BRAKE OPERATING MECHANISM
Filed June 19, 1935
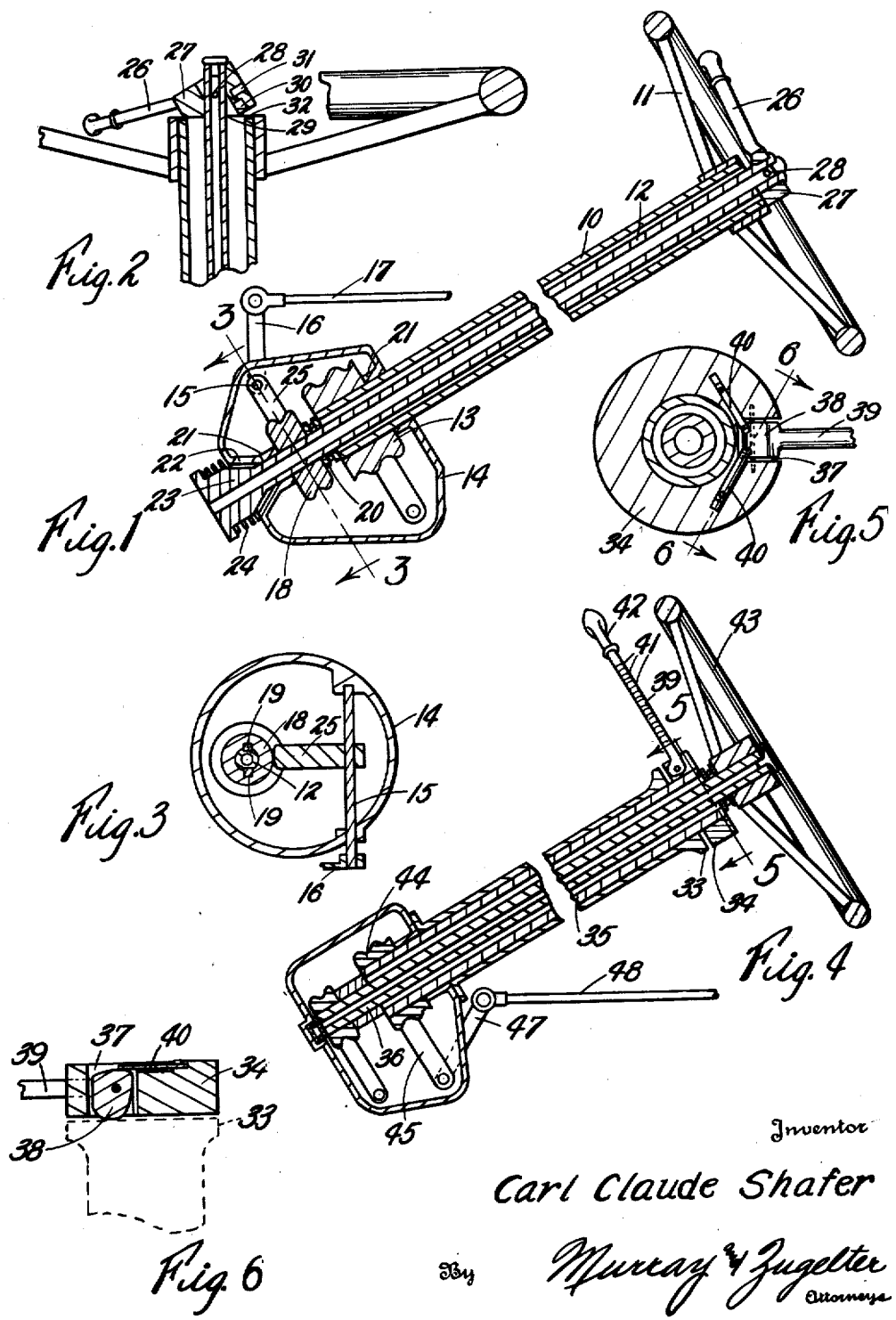
Inventor
Carl Claude Shafer
By Murray & Zugelter
Attorneys Patented Sept. 6, 1938

2,128,969

UNITED STATES PATENT OFFICE 2,128,969

HAND BRAKE OPERATING MECHANISM

Carl Claude Shafer, Cincinnati, Ohio

Application June 19, 1935, Serial No. 27,377

15 Claims. (Cl. 74—485)

The present invention relates to operating mechanism for hand brakes for vehicles and has for an object the provision of an efficient, compact and easily operable control affording the driver of a vehicle a maximum of certainty and ease in the operation thereof.

Another object of the invention is to provide brake operating mechanism of this character that is positive in its response to the actuation thereof.

A further object of the invention is to provide hand brake operating mechanism that is self-holding in all adjusted positions and that is not influenced by strain on the brake linkage or rods.

Still another object of the invention is to provide a brake control lever that is adapted to be retained in adjusted position, against movement by accidental contact, by the mere tilting thereof and which is furthermore readily adapted to be locked in tilted position against unauthorized release of the brake controlled thereby.

Amongst other valuble objects of the invention are the provision of a mechanism that is adapted to embodiment within or around the steering column of a motor vehicle or otherwise conveniently accessible to the driver as for example on the dash and the further provision of the conjoint locking of both steering wheel and brake with a single key controlled device when said brake control and steering post are unified within a single casing.

These and other objects are attained by the means herein described and disclosed in the accompanying drawing, in which:

Fig. 1 is a fragmental longitudinal sectional view of a steering assembly having the hand brake control of the invention embodied therein and in operative position.

Fig. 2 is a fragmental sectional view of the device of Fig. 1 showng the brake lever adjusted to resist accidental movement and in position to be locked against unauthorized operation.

Fig. 3 is a view taken on line 3—3 of Fig. 1.

Fig. 4 is a fragmental longitudinal sectional view showing a modified form of the invention.

Fig. 5 is a view taken on line 5—5 of Fig. 4.

Fig. 6 is a view taken on line 6—6 of Fig. 5.

It has been heretofore proposed to operate the hand brake of a motor vehicle from a position conveniently close to the normal location of the driver's hands during operation of the vehicle but such heretofore proposed mechanisms have been open to various disadvantages that have precluded practical use thereof to any notable extent.

The present invention seeks to take advantage of the convenient location of the brake lever and to not only eliminate the disadvantages of previously proposed mechanisms but also provide further advantages that were not possible in the prior art devices.

In keeping with the foregoing, the control lever 5 is so mounted as to be easily reached and operated by the driver. For example, the brake lever may be mounted for easy rotational movement of a brake operating shaft that projects forwardly and upwardly from the dash or from the side or floor of the vehicle in a manner that is easily understood, or as shown in the drawing the lever and shaft may be embodied as part of the steering unit of the vehicle. While the latter is preferable, the invention is not to be considered as limited to the particular mounting and location of the brake control mechanism.

The invention consists broadly in the provision of a lever operated shaft having at its lower end a self-locking or irreversible driving connection to convert rotary movement of the shaft into rocking movement of what may be conveniently considered a bell crank lever having the usual brake arm as one of its members. The self-holding or irreversible connection between the shaft and the bell crank lever may be of the worm and gear segment type, or any equivalent arrangement such as a screw and threaded collar, a helical track, cam or slot and lever, gears or a rack and pinion, all of which would be formed to a proper pitch that would preclude strain from the brake linkage and brakes from transmitting any movement to the operating shaft and in known fashion may be cut with an initial "rapid" pitch so as to take up play or looseness quickly. The cam, worm or helical track or equivalent member need not completely surround the shaft as only about 180° of turning movement is necessary for full range of operation. The brakes are therefore held securely in position as determined by the movement of the shaft by the operating lever.

Means are provided whereby movement of the lever, transversely of its normal operating movement, serves to hold the lever in adjusted position against accidental movement by inadvertent contact therewith. It is further proposed that the operating lever be capable of being held in an inoperative position at any degree of setting of the brakes and under the control of key operated locking means as a theft deterrent means, and to preclude unauthorized operation of the vehicle.

Referring now to the drawing, and particularly to Fig. 1, a hollow steering column or shaft 10 having the steering wheel 11 attached thereto contains a brake operating shaft 12 which may also be of tubular form and which projects beyond the steering worm and sector mechanism 13 in the usual housing 14. Suitably journaled in the housing 14 is a transverse member 15 which has fixed thereon, exteriorly of the housing 14, an arm 16 to which is attached the brake rod or cable 17. Irreversible drive connection between member 15 and the shaft 12 is effected by suitable means such as the worm 18 which is suitably splined on said shaft, as by keys 19, to rotate with said shaft 12. A suitable bearing 20 is interposed between the steering mechanism and said worm 18 and bushings 21, integral with the casing 14, or otherwise serve to hold the parts in position while permitting the proper rotational movement thereof.

In the embodiment shown in Fig. 1, the casing 14 has a frusto-conical sleeve 22 concentric with the axis of shaft 12 and said shaft has fixed thereon a complementary hub member 23 with an interposed spring means 24 yieldably holding the tapered faces of the members 22 and 23 out of frictional contact. The splined connection between shaft 12 and worm 18 permits hub member 23 to be drawn up, against the resistance of the spring 24, so that the shaft is thereby bound against rotation relative to casing 14. From the foregoing it will be seen that normally the shaft 12 may be turned and that worm 18 operating on arm or finger 25 which is fixed to transverse member 15 will actuate brake rod 17. The members 15, 16 and 25 constitute a bell crank lever of simple design. The strains of the brakes (not shown, but which may be of conventional type) cannot impart any movement through the irreversible or self-holding connection between members 18 and 25 to shaft 12.

In order to operate the brake through the structure just described, an actuating lever 26 is provided above steering wheel 11. The lever 26 has a hub 27 with an odd shaped aperture therethrough to receive the upper end of shaft 12 and to permit rocking of the lever toward and away from the steering wheel 11 on the pin 28. The lower face of hub 27 is cut away to provide a fulcrum edge 29 so that when the lever 26 is pushed down, toward the steering wheel, the shaft 12 is moved longitudinally upwardly until the tapered sleeve member 23 frictionally binds in the tapered hub 22 thereby overcoming the spring 24. When the lever is moved past dead center (to the position shown in Fig. 2) the shaft 12 is held against accidental movement and the brakes under control of rod 17 remain in the position determined by the position of the shaft 12. A locking bolt 30, housed in hub 27, and under control of a key operated lock 31, has a suitable edge for engaging in serrations 32 in the steering post, wheel or hub, so as to wedge the lever 26 in depressed position and preclude movement of the steering wheel at the same time. This serves as an effective deterrent against theft or surreptitious operation of the car or release of the brakes thereof.

In operation the device thus described affords the driver an easy and convenient control of the brake by turning lever 26 through substantially 180° with said lever disposed at substantially a right angle to shaft 12. Whenever the brakes are to be held in any given position, the driver merely pushes down on the lever 26 to effect the frictional binding of the shaft.

In the embodiment of the invention illustrated in Figs. 4, 5 and 6, the vehicle steering column is also shown as the supporting means for the brake operating device, but this form of the device will be understood to be readily applicable to other convenient installations which are or are not intimately associated with the steering column. In this embodiment the steering column (or casing or other support) provides a shouldered or flanged member 33 above which a hub 34 is fixed on a brake operating shaft 35 projecting beyond the flange. The steering gear shaft 36 extends through and beyond either end of shaft 35 and is otherwise adapted according to selected and known construction to perform its usual functions in known manner. Hub 34 is slotted as at 37 and a cam shaped end 38 on actuating lever 39 is pivoted in said slot. When lever 39 is pushed down or tilted downwardly the cam frictionally binds on the roughened adjacent rim of flange 33 and precludes accidental turning of the hub and its associated shaft 35. One or more flat springs 40 serve to yieldably retain the cam and its lever 39 in either of its extreme positions accordingly as the lever is adjusted about the pivotal mounting of the cam.

It is considered desirable to form notches 41 along that side of lever 39 that is normally contacted by the driver's fingers in reaching for the lever so that he need not necessarily grasp the handle end 42 in initially operating the brakes. The lever may furthermore be slightly curved to make it more easily reached in its position beneath the steering wheel 43.

The lower end of shaft 35 carries a suitable cam or worm member 44 of suitably tapered form opererating a finger or lever 45 that is fixed on a suitably journaled rod 46 and which thereby transmits rocking movement to arm 47 that is connected to the brake rod 48. Movement of the hub 34 through 180° more or less of movement by means of lever 39 effects full application of the brakes. Whenever the lever 39 is tilted about the pivot of the cam, it is frictionally bound on the flange 33 against further operation. This form of the invention is considered especially desirable for use in motor trucks because of its simplicity and ready adaptability to fabrication into sturdy structure. Very little manual force is required to exert heavy braking action so that while the structure is purely a mechanical one, its operation in practice partakes of the hydraulic or air brake style of manipulation in that the application and release is subject to easy control with the fingers. The brake operating lever is always within a reasonable range of vision of the driver and its position informs him at once whether the brake is fully or only partly released and thereby avoids the harmful results of driving with the brakes partly engaged. While either device would normally be used in lieu of the so-called "hand-brake" or "emergency brake", it may be connected in any suitable fashion to foot operated brake systems within the scope and spirit of this invention, and it is further to be understood that the invention herein is not to be considered as limited to the exact structural embodiments herein illustrated.

What is claimed is:

1. In a ratchetless braking system the combination with a vehicle brake operating rockable arm, of a rotatable shaft manually operable through substantially one-half revolution, complementary irreversible drive connecting members mounted directly on said shaft and said arm respectively, and a hand lever mounted on the shaft for effecting limited rotary movement of the shaft whereby said brake arm is moved into adjusted braking and non-braking positions, said irreversible connecting members serving to hold the shaft against movement due to brake strain from the rockable arm.

2. In a vehicle brake ratchetless control mechanism the combination of a pair of concentrically mounted tubular shaft members, a transverse rockable member, fixedly mounted support means therefor, a brake operating arm on the rockable member, complementary means on one of said shafts and said rockable member providing irreversible actuation of the rockable member by said shaft, a hand lever mounted on said shaft for rotating the shaft and means operative on tilting of the lever transversely of its normal plane of movement for frictionally binding said shaft and lever on the fixed supporting means to preclude manual operation of the shaft by the lever.

3. In combination with a motor vehicle steering mechanism and a rockable brake operating mechanism, a shaft extending through the steering mechanism, an irreversible drive connection operating directly between said shaft and said rockable brake operating mechanism, said shaft having a fixed off position independent of the steering mechanism, a hand lever adapted to rotate said shaft and serving to visibly indicate the off position of the shaft and brake operating mechanism, said lever being mounted on said shaft for tilting movement in the plane of the axis of said shaft, and means actuated by said tilting movement of the lever for frictionally holding said shaft and lever against rotary movement by said lever.

4. In combination a casing having a tapered sleeve therein, a shaft mounted for rotation in said casing and having a tapered hub adapted for frictional binding on said sleeve, means yieldably retaining said hub out of engagement with said sleeve, a rockable brake operating member, complementary helical track and lever members on said shaft and said rockable member respectively, a hand lever pivoted on said shaft and also adapted to be actuated for effecting rotary movement of the shaft, means operable upon tilting of the lever on said pivot for moving said shaft axially whereby the tapered hub is moved into frictional engagement with said sleeve against the resistance of said yieldable means and a key operated bolt for retaining said lever in tilted position.

5. In a device of the class described the combination with a rockable member comprising a brake operating mechansm, of a shaft having a portion adjacent said rockable member, complementary means on the rockable member and the shaft providing an irreversible actuating connection from the shaft to the rockable member, a hub whereby the shaft is rotatable, a lever having a cam portion pivoted on said hub and a nonmovable shoulder adjacent the hub and adapted to be frictionally engaged by the cam upon tilting movement of the lever on its pivot for holding the hub and associated shaft against rotary movement by said lever, said lever, shaft and complementary means having a fixed off position relative to said non-movable shoulder whereby the lever indicates the condition of the operating means when in tilted and non-tilted position on the shaft.

6. A ratchetless brake operating mechanism comprising a rotatably mounted shaft, a helical track having an initially rapid pitch and a succeeding slower pitch on said shaft, a brake linkage controlling bell crank lever having one end thereof directly engaging on said track, said bell crank lever adapted for connection with a brake linkage whereby constant speed rotation of the shaft rapidly takes up slack in said linkage and then gradually effects operating movement of said linkage, the said track and engaging lever providing balanced leverage against brake strain in all braking positions, and a hand lever on the shaft for manually effecting adjustment of the track about its axis in an operating cycle of substantially less than one-half of a revolution.

7. In a vehicle brake operating means, the combination of a lever, a rotatable shaft concentric with the steering column of the vehicle and operable by said lever, brake mechanism, means irreversibly operable by the shaft for actuating the brake mechanism, and means actuated by the lever for shifting the shaft axially, a friction member on the shaft, and a complementary friction member fixed adjacent the first mentioned friction member, movement of the shaft by said lever actuated means serving to engage said friction members for retaining the shaft against rotation.

8. In a vehicle brake operating mechanism, the combination with a steering column, of a shaft mounted concentrically therewith, brake mechanism, means to effect irreversible movement of the brake mechanism by rotary movement of said shaft, a lever on said shaft for manually operating the shaft and cam operated means operable by the said lever for frictionally holding the shaft against movement by said lever.

9. Vehicle brake operating mechanism comprising brake linkage, a rotatable shaft, a hand lever carried thereby normally operable to manually effect rotary movement of said shaft through substantially less than one-half revolution, brake linkage irreversibly operable by rotation of the shaft and means operated by the lever to frictionally hold the shaft in adjusted position against rotary movement by said hand lever.

10. In a device of the class described, the combination of a rotatably mounted helical track having a varying pitch, a rockably mounted lever meshing with said track, a brake connection actuated by movement of said lever, and a hand lever for turning the track on its axis through an operating cycle of less than one revolution, said track and meshing lever providing balancing leverage against brake strain in all braking positions of the lever whereby the hand lever and the track remain in adjusted positions and whereby the hand lever serves as a means to visibly indicate the off position of the brake mechanism, the varying pitch of the track being relatively steep adjacent one end whereby unbalanced leverage is provided between the track and meshing lever adjacent the off position of the hand lever.

11. In a motor vehicle braking system, the combination with a steering mechanism including its support and a steering wheel, of a shaft mounted concentrically of and supported in the steering mechanism for independent operation, a lever at the top of said shaft and in proximity with the steering wheel, foot brake mechanism, a helical track on said shaft and a rockable lever meshing therewith, said lever serving to actuate the brake mechanism and effecting self-holding adjustment of the braking mechanism in all adjusted positions of said hand lever, said hand lever serving to independently operate the braking mechanism.

12. In combination a brake actuating mechanism including a bell crank lever, a rotatably mounted shaft, a helical track of varying pitch on said shaft, said bell crank lever meshing with said track whereby rotary movement of the shaft serves to actuate the brake mechanism through said bell crank lever, and means for manually turning the shaft to approximately 180° between limits of off position and applied positions of the brake actuating means.

13. In a vehicle control the combination of steering mechanism including a steering wheel, a shaft supported concentrically in the steering mechanism for free and independent movement relative thereto, a hand lever on said shaft disposed closely adjacent the steering wheel and operable by the user without removal of the hands from the steering wheel, brake mechanism, and irreversible complementary drive means respectively mounted on said shaft and said brake mechanism whereby said shaft, hand lever and brake mechanism remain in adjusted positions independently of the steering wheel and whereby said hand lever is caused to assume a uniform position relative to the user when the shaft is actuated to full released position of the braking mechanism.

14. In combination a steering column assembly, a fixed casing associated therewith at the bottom thereof, transverse rock shafts journalled in said casing, a shaft rotatably supported concentrically in the steering column and freely operable independently thereof, a helical cam track member mounted on said shaft within said casing, a finger member mounted on one of said rock shafts and meshing with said helical cam track, and brake operating mechanism operatively connected with the said rockable shaft, manual rotation of the said concentric shaft serving as ratchetless brake control means which is self-holding against brake strain in all effective braking positions, said helical cam track having an initially steep pitch upon which said finger member is not self-holding.

15. In a ratchetless braking system the combination of a rockable arm for connection with a vehicle brake linkage, a finger on said rockable arm, a shaft, a cam track member extending about the shaft and movable therewith in opposite directions through less than one complete revolution, said cam track having an initially steep short pitch angle, said finger engaging on said cam track and movable thereby upon rotation of the shaft for actuating the brake linkage, said finger being irreversibly movable by the cam track when engaging said cam track beyond said initially steep short pitch angle and a hand lever on the shaft for manually turning the shaft and cam for controlling the brake linkage, the normal strain of the brake linkage on said finger, when said finger engages the steep short pitch angle of the cam, serving to urge the cam, shaft, and hand lever to a predetermined brake releasing position.

CARL CLAUDE SHAFER.

---

CERTIFICATE OF CORRECTION.

Patent No. 2,128,969.　　　　　　　　　　　　September 6, 1938.

CARL CLAUDE SHAFER.

It is hereby certified that error appears in the printed specification of the above numbered patent requiring correction as follows: Page 3, first column, line 8, claim 2, strike out the words and comma "fixedly mounted support means therefor," and insert the same after "members" and before the comma in line 7, same claim; and that the said Letters Patent should be read with this correction therein that the same may conform to the record of the case in the Patent Office.

Signed and sealed this 1st day of November, A. D. 1938.

Henry Van Arsdale (Seal)　　　　　　　　　　　　　　　　　Acting Commissioner of Patents.

nism including a bell crank lever, a rotatably mounted shaft, a helical track of varying pitch on said shaft, said bell crank lever meshing with said track whereby rotary movement of the shaft serves to actuate the brake mechanism through said bell crank lever, and means for manually turning the shaft to approximately 180° between limits of off position and applied positions of the brake actuating means.

13. In a vehicle control the combination of steering mechanism including a steering wheel, a shaft supported concentrically in the steering mechanism for free and independent movement relative thereto, a hand lever on said shaft disposed closely adjacent the steering wheel and operable by the user without removal of the hands from the steering wheel, brake mechanism, and irreversible complementary drive means respectively mounted on said shaft and said brake mechanism whereby said shaft, hand lever and brake mechanism remain in adjusted positions independently of the steering wheel and whereby said hand lever is caused to assume a uniform position relative to the user when the shaft is actuated to full released position of the braking mechanism.

14. In combination a steering column assembly, a fixed casing associated therewith at the bottom thereof, transverse rock shafts journalled in said casing, a shaft rotatably supported concentrically in the steering column and freely operable independently thereof, a helical cam track member mounted on said shaft within said casing, a finger member mounted on one of said rock shafts and meshing with said helical cam track, and brake operating mechanism operatively connected with the said rockable shaft, manual rotation of the said concentric shaft serving as ratchetless brake control means which is self-holding against brake strain in all effective braking positions, said helical cam track having an initially steep pitch upon which said finger member is not self-holding.

15. In a ratchetless braking system the combination of a rockable arm for connection with a vehicle brake linkage, a finger on said rockable arm, a shaft, a cam track member extending about the shaft and movable therewith in opposite directions through less than one complete revolution, said cam track having an initially steep short pitch angle, said finger engaging on said cam track and movable thereby upon rotation of the shaft for actuating the brake linkage, said finger being irreversibly movable by the cam track when engaging said cam track beyond said initially steep short pitch angle and a hand lever on the shaft for manually turning the shaft and cam for controlling the brake linkage, the normal strain of the brake linkage on said finger, when said finger engages the steep short pitch angle of the cam, serving to urge the cam, shaft, and hand lever to a predetermined brake releasing position.

CARL CLAUDE SHAFER.

---

CERTIFICATE OF CORRECTION.

Patent No. 2,128,969.   September 6, 1938.

CARL CLAUDE SHAFER.

It is hereby certified that error appears in the printed specification of the above numbered patent requiring correction as follows: Page 3, first column, line 8, claim 2, strike out the words and comma "fixedly mounted support means therefor," and insert the same after "members" and before the comma in line 7, same claim; and that the said Letters Patent should be read with this correction therein that the same may conform to the record of the case in the Patent Office.

Signed and sealed this 1st day of November, A. D. 1938.

Henry Van Arsdale (Seal)   Acting Commissioner of Patents.